(12) United States Patent
Sridharan et al.

(10) Patent No.: US 12,111,719 B2
(45) Date of Patent: Oct. 8, 2024

(54) REMOTE SCALABLE MACHINE CHECK ARCHITECTURE

(71) Applicant: Advanced Micro Devices, Inc., Santa Clara, CA (US)

(72) Inventors: Vilas K. Sridharan, Boxborough, MA (US); Magiting Talisayon, Boxborough, MA (US); Srikanth Masanam, Hyderabad (IN); Dean A. Liberty, Nashua, NH (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 35 days.

(21) Appl. No.: 17/854,788

(22) Filed: Jun. 30, 2022

(65) Prior Publication Data

US 2024/0004750 A1    Jan. 4, 2024

(51) Int. Cl.
     *G06F 11/07*      (2006.01)

(52) U.S. Cl.
     CPC ...... *G06F 11/0787* (2013.01); *G06F 11/0709* (2013.01); *G06F 11/0721* (2013.01)

(58) Field of Classification Search
     CPC ............. G06F 11/0709; G06F 11/0721; G06F 11/0793; G06F 11/0772; G06F 11/0787
See application file for complete search history.

(56) References Cited

U.S. PATENT DOCUMENTS

| | | | |
|---|---|---|---|
| 6,763,456 B1 * | 7/2004 | Agnihotri | G06F 11/0748 714/48 |
| 7,146,477 B1 | 12/2006 | Strongin et al. | |
| 7,269,768 B2 | 9/2007 | Rothman et al. | |
| 8,839,032 B2 | 9/2014 | Walton et al. | |
| 11,061,753 B2 | 7/2021 | Liberty et al. | |
| 2002/0133655 A1 | 9/2002 | Falik et al. | |
| 2006/0143515 A1 | 6/2006 | Kuramkote et al. | |
| 2007/0061634 A1 | 3/2007 | Marisetty et al. | |
| 2008/0005615 A1 | 1/2008 | Brenden et al. | |
| 2014/0237299 A1 | 8/2014 | Nachimuthu et al. | |
| 2019/0251297 A1 | 8/2019 | Khan et al. | |
| 2020/0409784 A1 * | 12/2020 | Ould-Ahmed-Vall | G06F 11/0793 |

* cited by examiner

*Primary Examiner* — Joseph R Kudirka
(74) *Attorney, Agent, or Firm* — Kowert, Hood, Munyon, Rankin & Goetzel, P.C.; Rory D. Rankin

(57) ABSTRACT

An apparatus and method for supporting communication during error handling in a computing system. A computing system includes a first partition and a second partition, each capable of performing error management based on a respective machine check architecture (MCA). The first partition includes a host processor that executes an exception handler for managing reported errors. A message converter unit of the second partition assists in generating messages based on detected errors in the second partition. The message converter unit receives requests from hardware components of the second partition for handling errors and translates MCA addresses between the first partition and the second partition. To support the message converter unit, during an earlier bootup operation, the second partition communicates the hardware topology of the second partition to the host processor, and the host processor sends address translation information.

20 Claims, 5 Drawing Sheets

REMOTE SCALABLE MACHINE CHECK ARCHITECTURE

BACKGROUND

Description of the Relevant Art

In computing systems, multiple applications exploit parallel processing and large amounts of shared memory. Examples of these applications are machine learning applications, entertainment, and real-time applications, as well as some business, scientific, medical, and other applications. As computer memory storage and data bandwidth increase, so does the amount and complexity of data that organizations daily manage. To support multiple client computing devices running multiple various applications, an organization uses a distributed storage system. In some cases, such a system is a cluster of servers placed in one or more rooms of a building. The servers are connected to multiple peripheral devices, which can provide further computing capability.

When transferring information between functional blocks in the multiple semiconductor chips in the cluster of computing resources, electrical signals are sent on multiple, parallel metal traces, and these traces have transmission line effects such as distributed inductance, capacitance, and resistance throughout its length. For modern integrated circuits, the constantly decreasing widths of transistors and metal traces reduces signal integrity. In addition, as the operating voltage continues to decrease to reduce power consumption, the signal swing used for Boolean logic decreases as well as the noise margin. Therefore, the bit error rate in a computing system increases as the complexity increases and the manufacturing processes continue to advance.

To improve reliability and reduce down time, error handling techniques are performed by the hardware. However, as the complexity of the computing system increases, the number of hardware topologies made available by separate components, such as the motherboard and cards providing access to peripheral devices, also increases. Communication for error handling among the separate components is no longer straightforward.

In view of the above, efficient methods and apparatuses for supporting communication during error handling are desired.

Figure 1:
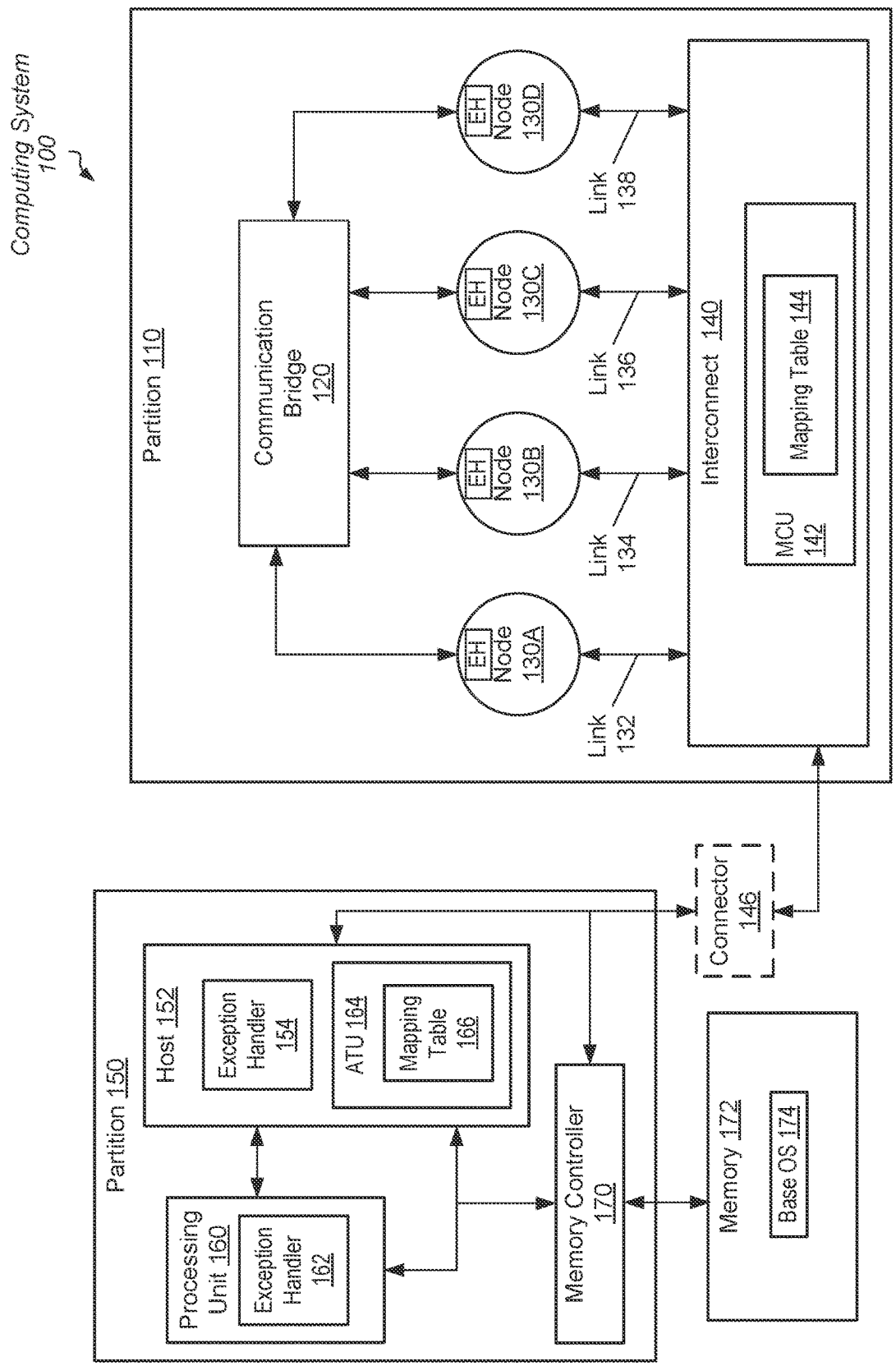
FIG. 1 is a generalized block diagram of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for supporting communication during error handling in a computing system are contemplated. In various implementations, a computing system includes a host processor that assigns tasks to multiple partitions with each partition including one or more processing nodes. As used herein, a "processing node" is also referred to as a "node." A node includes one or more processors and local memory. In an implementation, the host processor is a central processing unit (CPU) in a first partition of the multiple partitions. In various implementations, each of two or more partitions of the multiple partitions performs error management based on a respective machine check architecture. For example, the first partition performs error management based on a first machine check architecture (MCA), and a second partition of the multiple partitions performs error management based on a second MCA different from the first MCA.

The hardware of the first partition supports the first MCA. For example, the hardware of the first partition includes circuitry for error detection and reporting distributed across the hardware components of the first partition such as other processors with multiple processor cores besides the host processor, other application specific integrated circuits (ASICs), controller and interface units, and so on. As used herein, in various implementations the term "unit" refers to a circuit or circuitry. For example, an interface unit may refer to an interface circuit or interface circuitry. The hardware of the host processor provides banks of memory assigned to the different hardware components of the first partition. Particular banks of the assigned banks are reserved for particular error types. Threads of a process running on the hardware components are permitted to access particular banks. When an error occurs and circuitry of the hardware component detects the error, the hardware component stores error log information in the assigned banks. The hardware of the host processor also executes a base operating system that includes an exception handler that combined with the hardware of the first partition supports the machine check architecture (MCA) of the first partition.

The MCA defines the steps and techniques used by the first partition for detecting, reporting, and handling errors that occur in the computing system. Examples of the errors are translation lookaside buffer (TLB) errors, system bus errors, random access memory (RAM) storage errors, bit flipping errors, and so forth. In an implementation, the second partition of the multiple partitions includes multiple processors, each with multiple processor cores, of a compute accelerator. In an example, each of the multiple processors of the compute accelerator is a parallel data processing unit, and each of the multiple processor cores uses a relatively wide single instruction multiple data (SIMD) micro-architecture to achieve high throughput in highly parallel data applications. In some implementations, the nodes of the second partition are non-uniform memory access (NUMA) nodes utilizing the parallel data processing units to process parallel data tasks.

To detect errors in the computing system, the host processor performs queries, such as searching particular control registers to detect whether errors have occurred. These control registers are updated with error log information by other hardware components in the first partition. In some implementations, the control registers are machine-specific control registers implemented as flip-flop circuits with protected access. In other implementations, the control registers are machine-specific control registers implemented as regions of memory with protected access. Additionally, to detect errors in the computing system, other processors, cores, functional blocks, controllers, and so on, execute exception handlers that generate an exception and send the indications of an error to the host processor while also updating the control registers. These examples of circuitry (components) are considered "local," since they are located in a same partition as the host processor, which supports the first MCA. In contrast, the parallel data processing units of the second partition are considered "remote," since they are located in a different partition, such as the second partition, that supports the second MCA different from the first MCA.

In an implementation, the hardware components of the first partition are located on a motherboard, and the hardware components of the second partition are located on a card that is inserted in a slot or socket on the motherboard. In another implementation, the second partition is also located on the motherboard. In other implementations, the locations of the first partition and the second partition relative to the motherboard are set based on design requirements. In some implementations, the second partition does not include a host processor such as a CPU. In other implementations, the second partition does include a host processor such as a CPU. Typically, the first MCA supported by the first partition does not communicate with the second MCA supported by the second partition.

Typically, the first MCA supported by the first partition does not communicate with the second MCA supported by the second partition. However, a message converter unit of the second partition is used that bridges communication. When a hardware component of the second partition detects an error, the hardware component stores corresponding error log information in a control register of the second partition. Additionally, the message converter unit (MCU) receives a request to send an indication of the error from the second partition to the host processor of the first partition. The MCU generates a write access request with a target address pointing to a storage location in a memory of the first partition, not the second partition. For example, the MCU translates addresses of an address space of the second partition to addresses of an address space of the first partition.

When sending the write access request to the MCU, the hardware component of the second partition used an address of a register or memory bank of the second partition. The MCU does not use this address to send a message to the first partition, but rather, uses a translated address that points to a control register or memory bank of the first partition. To support the MCU with generating the target address for the write access request, during an earlier bootup operation, the second partition communicates the hardware topology of the second partition to the host processor of the first partition. This communication also includes identification of the regions of memory in the second partition assigned to processor cores of the second partition to be used for storing error log information. While executing firmware during the bootup operation, the host processor sends the address translations to the MCU of the second partition. Further details are provided in the following discussion.

Turning now to FIG. 1, a generalized block diagram is shown of one implementation of a multi-node computing system 100. In the illustrated implementation, the computing system 100 includes the partition 150, the partition 110, and the memory 172. In some implementations, the computing system also includes the connector 146 to support data transfer between the partitions 110 and 150. In one implementation, the partition 150 includes components on a motherboard, the connector 146 is a slot or a socket on the motherboard, and the partition 150 is a card inserted in the connector 146. In another implementation, each of the partitions 110 and 150 is included on the motherboard, and the partitions 110 and 150 communicate with one another through metal traces on the motherboard. In such an implementation, a slot or socket type connector 146 is not used for communication between the partitions. In other implementations, the locations of the partition 110 and the partition 150 relative to the motherboard are set based on design requirements. In various implementations, each of the partitions 110 and 150 performs error management based on a respective machine check architecture.

In an implementation, the partition 150 is a system on a chip (SoC). In other implementations, the partition 150 is a multi-chip module (MCM). The host processor 152 of the partition 150 transfers commands, messages, and payload data with the partition 110 via at least the interconnect 140. In some designs, the host processor 152 is a general-purpose central processing unit (CPU) capable of executing instructions of a particular instruction set architecture (ISA). The processing unit 160 of the partition 150 is representative of a variety of types of integrated circuits such as another general-purpose processor core or unit, an applications specific integrated circuit (ASIC), a digital signal processor (DSP), or other. Although a single memory controller 170 is shown, in other implementations, another number of memory controllers are used in computing system 100. In various implementations, memory controller 170 receives memory requests from one or more of the host processor 152, the processing unit 160, and the partition 110, and schedules the memory requests using arbitration logic, and sends the scheduled memory requests to memory 172.

In an implementation, memory 172 is system memory for the computing system 100, and memory 172 is one of a variety of dynamic random access memory (DRAM) with a corresponding communication protocol supported by the memory controller 170. The communication protocol determines values used for information transfer, such as a number of data transfers per clock cycle, signal voltage levels, signal timings, signal and clock phases and clock frequencies. In some implementations, the computing system 100 is also connected to main memory, which is a lower level than the system memory 172 in a hierarchical memory subsystem. This main memory in the lower level than the system memory 172 is implemented with one of a variety of types of non-volatile, random access secondary storage of data. Examples of main memory are hard disk drives (HDDs) and solid-state disks (SSDs).

The partition 110 includes multiple processing nodes 130A, 130B, 130C and 130D (or nodes 130A-130D). Although four nodes 130A-130D are shown, in other designs, another number of nodes are used. The partition 110 also includes the communication bridge 120, the links 132-138, and the interconnect 140. Power controllers, interrupt controllers, network interfaces, phased locked loops (PLLs) or other clock generating circuitry, and cooling systems with fans are not shown for ease of illustration. In some implementations, each of the nodes 130A-130D includes one or more processors, local memory, a power controller, and so on.

In some designs, the nodes 130A-130D are non-uniform memory access (NUMA) nodes utilizing parallel data processors to process tasks. Each of the parallel data processors uses a relatively wide single instruction multiple data (SIMD) micro-architecture to achieve high throughput in highly parallel data applications. Each data element is processed independently of other data elements, but the same sequence of operations is used. The high parallelism offered by the hardware of the parallel data processors of the nodes 130A-130D is used for simultaneously processing the multiple data elements of the scientific, medical, finance, encryption/decryption, and other computations.

In various implementations, the partition 110 is a peripheral device of the partition 150. As used herein, the term "peripheral device" refers to a hardware device for providing particular functionality, which offloads a particular processor, such as the host processor 152 of the partition 150, allowing this particular processor to do other tasks. As used herein, the term "compute accelerator" refers to a hardware device that provides accelerated data processing, or higher throughput, of particular types of tasks. In an implementation, the partition 110 is a compute accelerator that provides high throughput of highly parallel data applications. In such an implementation, each of the nodes 130A-130D is a parallel data processor used in the compute accelerator. In an implementation, the computing system 100 is an exascale computing system that uses the compute accelerator (partition 110) to provide performance at a level of one exaflop. An exaflop is a billion billion calculations per second ($10^{18}$ calculations per second). In one implementation, the partition 110 is a multi-chip module (MCM) placed in a socket or slot (connector 144) of a multi-socket motherboard in a desktop computer or a server.

In various implementations, the nodes 130A-130D are connected to one another by the communication bridge 120 and/or by the interconnect 140 via the links 132-138. The nodes 130A-130D are connected to the memory controller 170 via the interconnect 140 and the connector 144 when it is used in the computing system 100. The communication bridge 120 supports direct communication between the nodes 130A-130D without transferring signals on the motherboard. In various implementations, interconnect 140 supports communication using point-to-point, packet-based, bus-based, including shared bus configurations, crossbar configurations, and hierarchical buses with bridges. In some implementations, interconnect 140 utilizes a communication fabric (or fabric).

Although a single line is shown to represent each of the links 132-138, each of the links 132-138 includes multiple lines, or physical wires or lanes, capable of transferring data as signals. Link interfaces across the computing system 100 and interconnect 140 support one or more communication protocols for transferring commands and data. Similar to the memory communication protocol, the supported communication protocols of interconnect 140, the connector 144, and other interfaces determine values such as a number of data transfers per clock cycle, signal voltage levels, signal timings, signal and clock phases and clock frequencies.

In some implementations, link interfaces across the computing system 100 and interconnect 140 includes queues for storing requests and responses, and selection logic implemented by hardware circuits capable of arbitrating between received requests before sending requests across interconnect 140. Interconnect 140 also includes circuitry capable of building and decoding packets, and selecting routes for the packets. Interconnect 140 transfers data, such as requests, responses, commands, messages, and payload data, back and forth between the partition 110 and the host processor 152 and the memory controller 170.

The hardware, such as the circuitry, of the host processor 152 executes a base operating system (OS) 174. The base OS 174 includes the exception handler 154 that together with the hardware distributed across the partition 150 supports a local machine check architecture (MCA). The local MCA defines the steps and techniques used by the exception handler 154 and the hardware distributed across the partition 150 for detecting, reporting, and handling errors that occur in the computing system. Examples of the errors are translation lookaside buffer (TLB) errors, system bus errors, random access memory (RAM) storage errors, bit flipping errors, and so forth. Components that include hardware in the partition 150 run an exception handler that sends messages to the host processor 152 for reporting errors, or store messages in a particular location that the host processor 152 queries during particular sampling intervals. For example, the host processor 152 runs the exception handler 154 and the processing unit 160 runs the exception handler 162. It is possible and contemplated that the memory controller 170 also runs an exception handler in order to participate in the local MCA that is supported by the hardware of the partition 150.

To detect errors in the computing system 100, the host processor 152 performs queries such as searching particular control registers (not shown) to detect whether errors have occurred. These queries are steps of the local MCA. Based on the local MCA, other processors, cores, functional blocks, controllers, and other types of circuitry of the partition 150 detect errors and send error log information to particular registers of these control registers, which are queried later by the host processor 152. In some implementations, the control registers are machine-specific control registers implemented as flip-flop circuits with protected access. In other implementations, the control registers are machine-specific control registers implemented as regions of memory 172 with protected access.

Additionally, to detect errors in the computing system 100, the other processors, cores, functional blocks, controllers, and other types of circuitry, such as at least processing unit 160, execute exception handlers that generate an exception and send the indications of an error directly to the host processor 152, rather than to control registers for storage. Generating exceptions in this manner is based on the local MCA.

The multiple nodes 130A-130D of the partition 110 support a remote MCA that is separate from the local MCA in the partition 150. For example, at least the nodes 130A-130D run an exception handler (EH) in the partition 110. Typically, the local MCA of the partition 150 does not communicate with the remote MCA of the partition 110. Therefore, errors that are detected in the partition 110 typically do not cause the components of the partition 110 to directly send error log information to the host processor 152. Similarly, errors that are detected in the partition 110 typically do not cause the components of the partition 110 to store error log information in particular control registers accessible by the host processor 152. The host processor 152 is unaware of the locations of these control registers of the partition 110. Similarly, the multiple nodes 130A-130D of the partition 110 are unaware of storage locations accessible by the host processor 152. Therefore, the local MCA of the partition 150 and the remote MCA of the partition 110 are different based at least upon the use of different control registers where the storage locations of these control registers are known to only one of the local MCA and the remote MCA. However, in various implementations, a message converter unit (MCU) 142 is used that bridges communication between the local MCA of the partition 150 and the remote MCA of the partition 110. The MCU 142 can be standalone circuitry or circuitry located within a preexisting processor core or functional block.

The MCU 142 uses the address mappings in the mapping table (or table) 144 when transferring messages between the partitions 110 and 150. By doing so, the local MCA of the partition 150 and the remote MCA of the partition 110 are able to communicate with another. In other implementations, the table 144 is implemented as a set of configuration registers with a position of a configuration register implying to which processor core of partition 150 the data of the configuration register is associated with. The stored data in the configuration register can include one or more of a processor core identifier (ID) used by circuitry of partition 150 for identifying the processor core to which to route a request, an address or an address range identifying a register in partition 150 to store data of a request sent from partition 110, and request type information.

When a hardware component, such as one of the nodes 130A-130D, of the partition 110 detects an error, the hardware component stores corresponding error log information in a control register (not shown) of the partition 110. Additionally, the MCU 142 receives a request to send an indication of the error from the partition 110 to the host processor 152 of the partition 150. The MCU 142 generates a write access request with a target address pointing to a storage location in a memory of the partition 150, not the partition 110. For example, the MCU 142 translates addresses of an address space of the partition 110 to addresses of an address space of the partition 150. In an implementation, the partition 110 does not include a host processor, such as a CPU, and therefore, each detected error has information sent to the host processor 152 of the partition 150. Accordingly, the MCU 142 does not determine whether an error should be reported to the host processor 152, since each error is reported to the host processor 152. In other implementations, the partition 110 includes a host processor that executes an exception handler, and in such implementations, the MCU 142 includes additional decision circuitry to determine whether to send an indication of a detected error to the host processor 152. For example, the host processor 152 is assigned to report all errors of the computing system 100 to assigned storage locations of system memory 172 for later user inspection.

When sending the write access request to the MCU 142, the hardware component, such as one of the nodes 130A-130D, of the partition 110 used an address of a register or memory bank of the partition 110. The MCU 142 does not use this address to send a message to the partition 150, but rather, uses a translated address that points to a control register or memory bank of the partition 150. To support the MCU 142 with generating the target address for the write access request, during an earlier bootup operation, the partition 110 communicates the hardware topology of the partition 110 to the host processor 152 of the partition 150. This communication also includes identification of the regions of memory in the partition 110 assigned to processor cores of the partition 110 to be used for storing error log information. While executing firmware during the bootup operation, the host processor 152 sends the address translations to the MCU 142.

To detect errors in the computing system 100, the host processor 152 performs queries, such as searching particular control registers (not shown) to detect whether errors have occurred. In some implementations, the control registers are machine-specific control registers implemented as flip-flop circuits with protected access. In other implementations, the control registers are machine-specific control registers implemented as regions of memory 172 with protected access. Additionally, to detect errors in the computing system 100, other processors, cores, functional blocks, controllers, and so on, such as at least processing unit 160, execute exception handlers that generate an exception and send the indications of an error to the host processor 152. Further, to detect errors in the computing system 100, the hard hardware components, such as the nodes 130A-130D, of the partition 110 execute exception handlers (EH) that both store error log information in assigned data storage locations of the partition 110 and send an indication of the error to the MCU 142.

The MCU 142 sends a write access request to the partition 150 to store information indicating the error. This information is either sent to the exception handler 154 of the host processor 152 as an exception, or this information remains stored in an assigned data storage location of the partition 150 to be queried later by to the exception handler 154 of the host processor 152.

When the host processor 152 in the partition 150 detects an error that requires information from the remote processor cores of the nodes 130A-130D, the host processor 152 generates a read access request with a target address pointing to a storage location in a memory of the partition 110, not the partition 150. The read access request requests error log information from a remote processor core of the nodes 130A-130D to be used for error processing by the host processor 152 of the partition 150. The host processor 152 either sends the read access request directly to the circuitry of the ATU 164, or the ATU 164 intercepts access requests generated by the host processor 152. In some implementations, the mapping table 166 stores address translations between local MCA memory storage locations (of partition 150) and remote MCA memory storage locations (of partition 110). In various implementations, the mapping table 166 is stored in secure memory. In an implementation, the original target address generated by the host processor 152 indicates a remote storage location to the ATU 164 and that the access request should be sent to the partition 110. In one implementation, a subset of the upper bits of the original target address provides the indication.

In various implementations, the base OS 174 is unaware of the additional address translation steps and the steps of transferring messages with the partition 110. For example, the MCA of the partition 150 uses banks of memory assigned to the different hardware components of the partition 150. Particular banks of the assigned banks are reserved for particular error types. Threads of a process running on the hardware components are permitted to access particular banks. When an error occurs and the hardware component detects the error, the hardware component stores error log information in the assigned banks. A subset of the banks of the assigned bank, though, are actually reserved for remote hardware components such as the nodes 130A-130D of partition 110. Although the base OS 174 is aware of the nodes 130A-130D of partition 110 for assigning tasks of applications, the base OS 174 is unaware of the reserved banks of memory for storing error log information corresponding to the nodes 130A-130D of partition 110. However, the exception handler 154 executed by circuitry of the host processor 152 and the circuitry of the ATU 164 are aware of the topology of the nodes 130A-130D of partition 110 and the corresponding assignments to the memory banks for reporting error log information.

When the ATU 164 determines the access request is directed toward remote circuitry, such as the nodes 130A-130D of partition 110, the ATU 164 accesses the mapping table 166, and generates a new target address. This new target address points to a data storage location in the partition 110 that is accessible by a corresponding one of the nodes 130A-130D. The ATU 164 inserts this new target address in the access requests. Alternatively, the ATU 164 simply replaces the previous (original) target address with the new target address. In some implementations, the mapping table 166 also stores a connector identifier such as a socket identifier, a slot identifier, or other that identifies the connector 146. This identifier is used to transfer the access request after address translation has completed.

Later, the partition 110 sends the requested error log information to the partition 150, and this information is stored in a particular storage location. In an implementation, this information is stored in the memory bank pointed to by the original target address. The exception handler 154 of the host processor 152 is made aware that the requested error log information is made available. When the host processor 152 receives the requested error log information, the host processor 152 completes processing of the error. For example, the host processor 152 performs one or more steps to correct the error and/or the host processor 152 sends error log information to system memory 172.

To support communication between the local MCA of the partition 150 and the remote MCA of the partition 110, in various implementations, during a bootup operation, firmware that is run by the host processor 152 (with the base OS 174 being unaware) or by other circuitry builds each of the mapping tables 166 and 144. This communication also includes identification of the regions of memory in the partition 110 assigned to processor cores of the nodes 130A-130D to be used for storing error log information.

Figure 2:
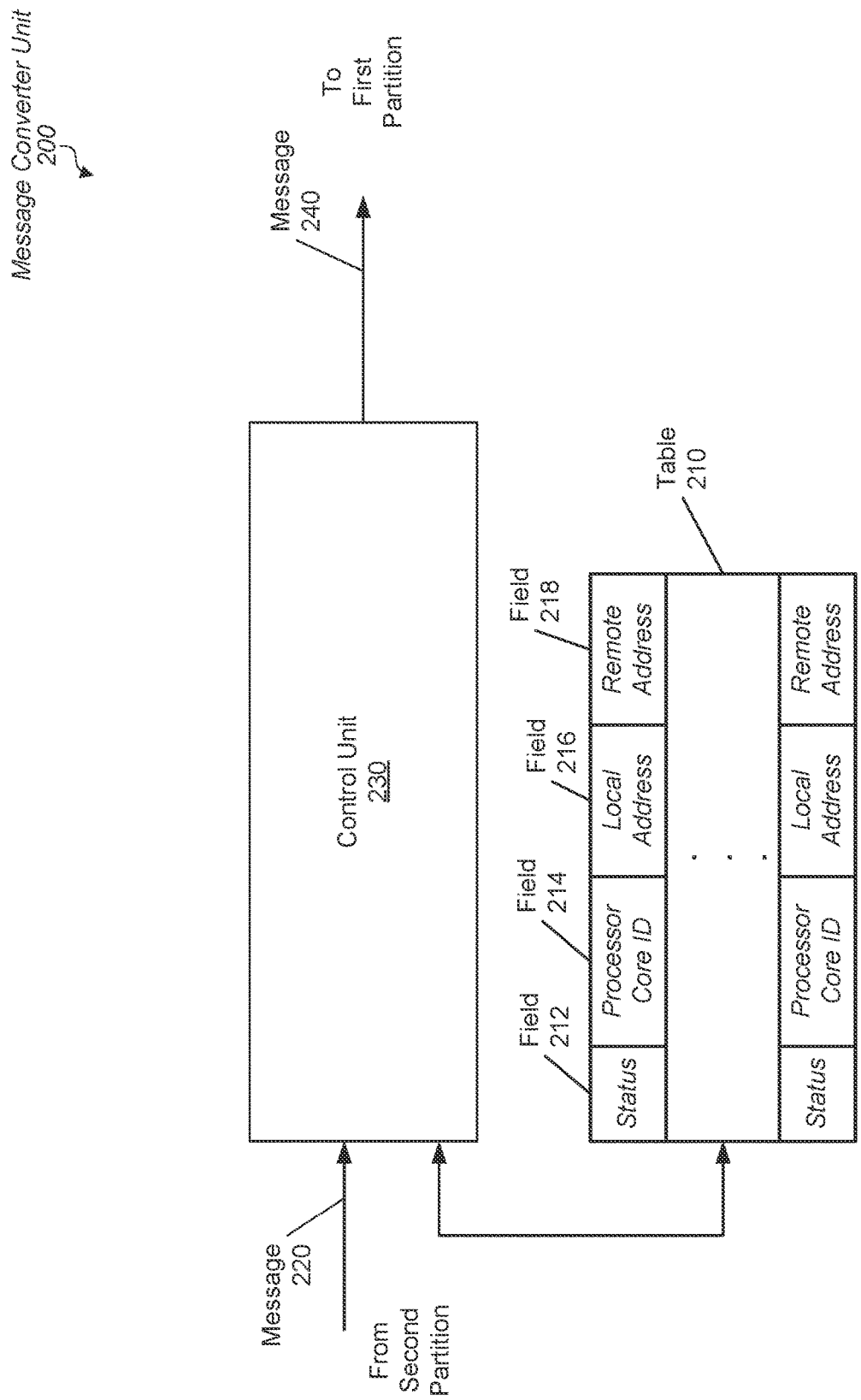
FIG. 2 is a generalized block diagram of a message converter unit.

Referring to FIG. 2, a generalized block diagram is shown of a message converter unit 200. As shown, the message converter unit 200 includes the table 210 and the control unit 230. In some implementations, the table 210 and the control unit 230 are placed on separate functional blocks or dies. In other implementations, the table 210 and the control unit 230 are located together. The table 210 includes multiple table entries (or entries), each storing information in multiple fields such as at least fields 212-220. The table 210 is implemented with one of flip-flop circuits, a set of configuration registers, a random access memory (RAM), a content addressable memory (CAM), or other.

Although particular information is shown as being stored in the fields 212-220 and in a particular contiguous order, in other implementations, a different order is used and a different number and type of information is stored. As shown, field 212 stores status information. An example of the status information is an indication of whether the address mapping is valid between a local address and a remote address. The field 214 stores a processor core identifier (ID) that specifies a processor core (or functional block) assigned to handle information collection, error handling, or other tasks corresponding to the local MCA address stored in field 216. It is noted that, here, the local MCA is directed toward a partition that does not include a host processor with responsibility of error management for multiple partitions such as at least error reporting to external memory. One example of this partition being considered "local" based on the perspective of the MCU 200 is the partition 110 (of FIG. 1). The remote address stored in field 218 is directed toward the memory storage locations placed in components in another partition such as the partition 150 (of FIG. 1). The local MCA address points to one of a variety of machine-specific registers or memory banks used in the local MCA. The field 218 stores a remote MCA address that points to a storage location in a remote location of a remote partition.

The control unit 230 receives the message 220 from one of the processors, such as a parallel data processing unit, of the local partition such as a compute accelerator. The control unit 230 accesses the table 210 based on a local MCA address of the message 220, and the control unit 230 performs any address translations needed for the message 220. The control unit 230 inserts a remote address and the processor core ID into the message. Modifying the message 220 as such generates the message 240 to send to its intended destination.

Figure 3:
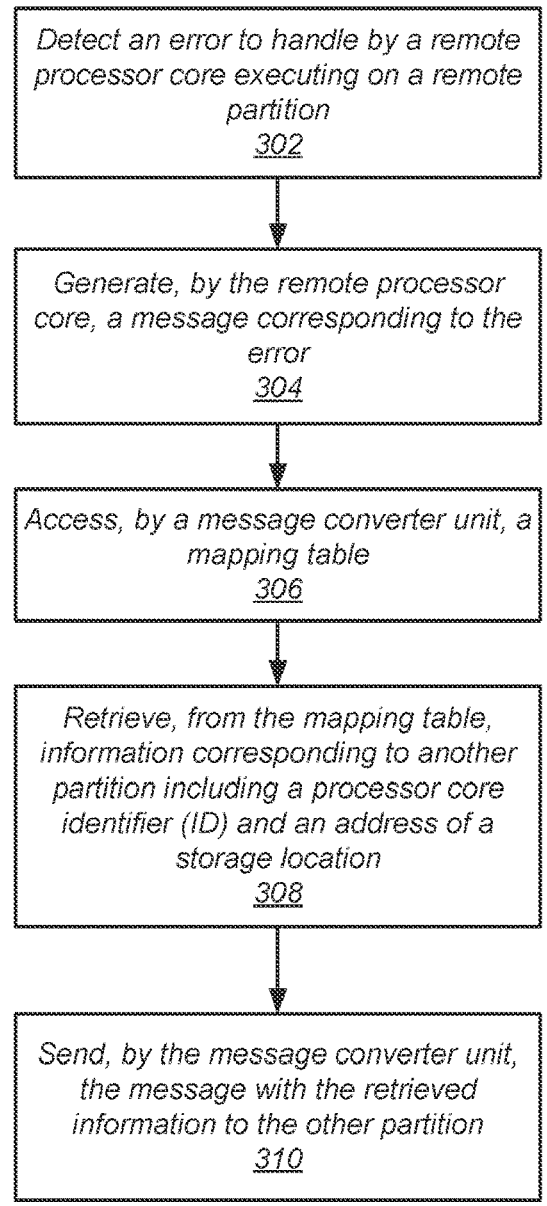
FIG. 3 is a generalized block diagram of a method for supporting communication during error handling in a computing system.

Referring to FIG. 3, a generalized block diagram is shown of a method 300 for supporting communication during error handling in a computing system. For purposes of discussion, the steps in this implementation (as well as in FIG. 5) are shown in sequential order. However, in other implementations some steps occur in a different order than shown, some steps are performed concurrently, some steps are combined with other steps, and some steps are absent. A remote processor core executing on a remote partition detects an error (block 302). Here, it is noted that the processor core is referred to as "remote" from the perspective of a local partition that includes a host processor with responsibility of error management for multiple partitions such as at least error reporting to external memory. The remote processor core generates a message corresponding to the error (block 304).

A message converter unit either receives or intercepts the message, and the message converter unit accesses a mapping table (block 306). The message converter unit uses one or more of a processor core identifier (ID) and an address of the message. The address of the message points to a storage location assigned to the remote processor core for storing error log information. The message converter unit retrieves, from the mapping table, one or more of a processor core identifier (ID) of another partition and an address of a storage location for the message in the other partition (block 308). In some implementations, the message converter unit also retrieves a connector identifier (ID) that specifies a connector to use to communicate with the other partition. The connector can be a slot or a socket on a motherboard. The message converter unit sends the message with the retrieved address to a processor core of the other partition specified by the processor core ID (block 310).

Figure 4:
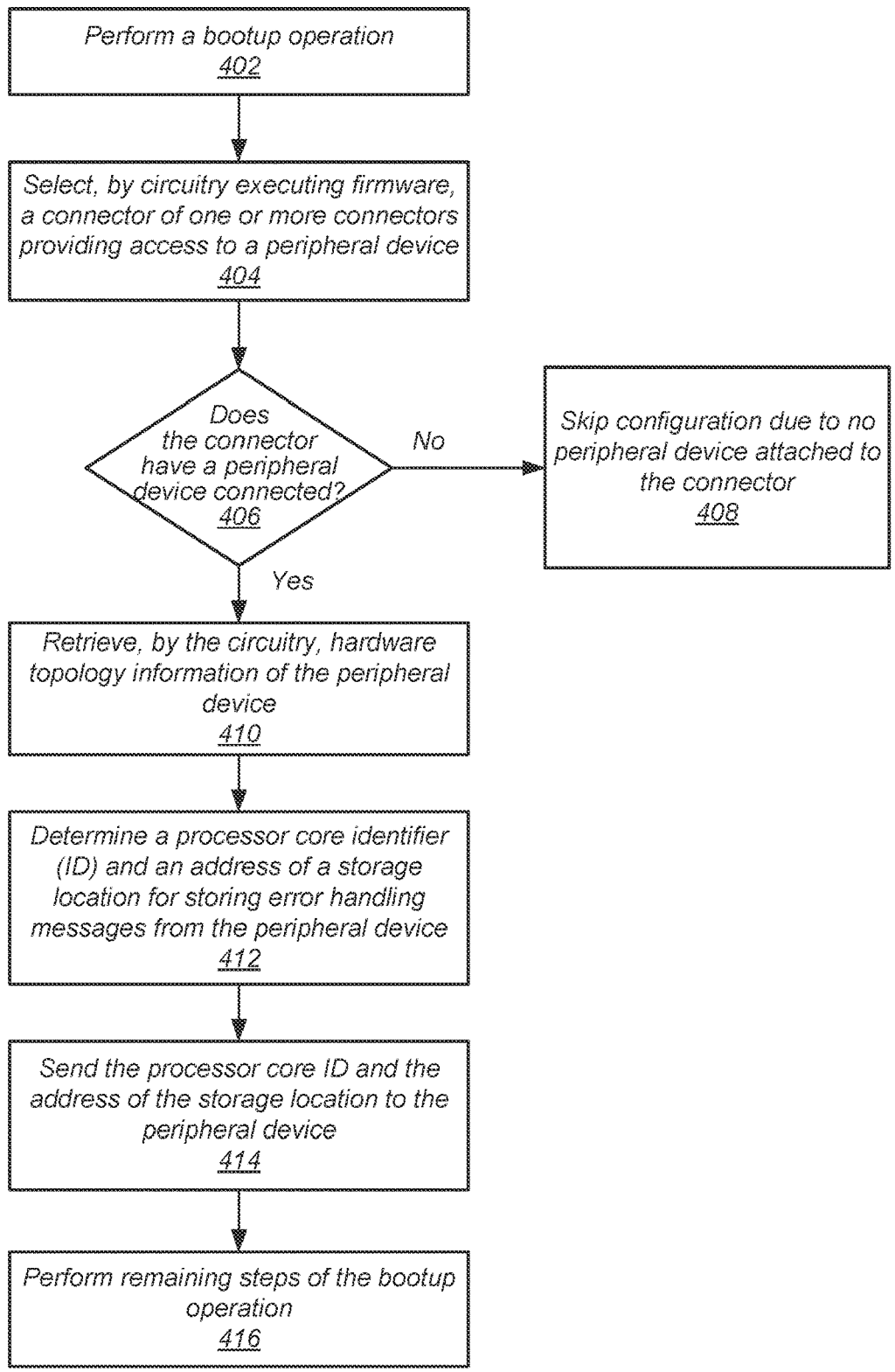
FIG. 4 is a generalized block diagram of for supporting communication during error handling in a computing system.

Turning now to FIG. 4, a generalized block diagram is shown of a method 400 for supporting communication during error handling in a computing system. Circuitry of a processor core executes firmware that performs a bootup operation (block 402). The processor core selects a connector of one or more connectors providing access to a peripheral device (block 404). If the processor core determines that the connector does not have a peripheral device connected ("no" branch of the conditional block 406), then the processor core skips configuration of an external peripheral device due to no peripheral device being attached to the connector (block 408).

If the processor core determines that the connector has a peripheral device connected ("yes" branch of the conditional block 406), then the processor core retrieves hardware topology information of the peripheral device (block 410). For example, the processor core requests and receives a number of hardware components of the peripheral device, identifiers of the hardware components, and addresses pointing to assigned data storage locations for storing error log information. The processor core determines a processor core identifier (ID) and an address of a storage location of the local partition on the motherboard for storing error handling messages from the peripheral device (block 412). The processor core sends the processor core ID and the address of the storage location to the peripheral device to store the information in an error handling mapping table of a message converter unit of the peripheral device (block 414). The processor core performs remaining steps of the bootup operation (block 416).

Figure 5:
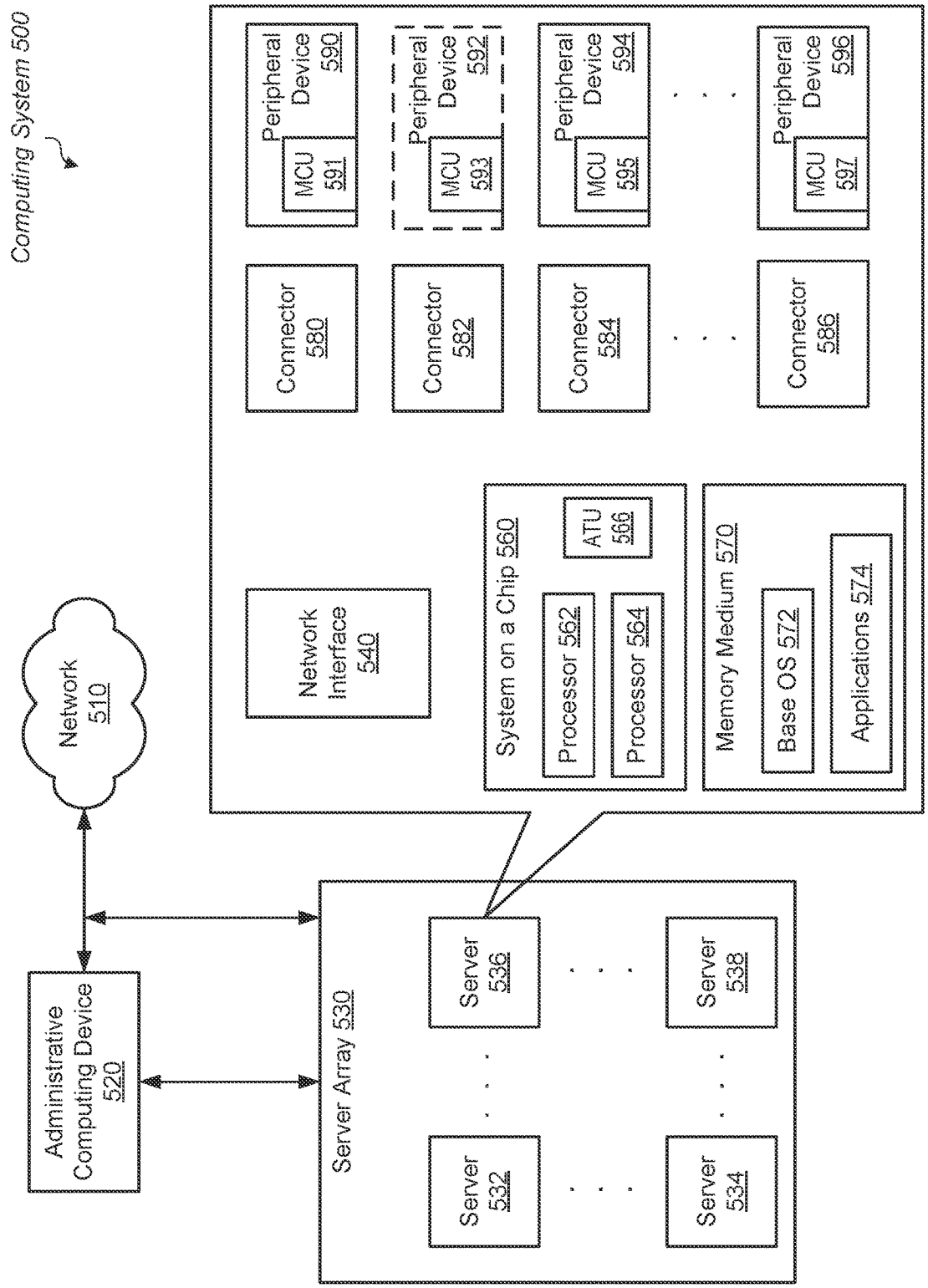
FIG. 5 is a generalized block diagram of a computing system.

Referring to FIG. 5, a generalized block diagram of one implementation of a computing system 500 is shown. As shown, the computing system 500 includes the server array 530 that uses multiple servers 532-538 that are interconnected to one another. The server array 530 is also connected to client computer systems (not shown) via at least the network 510. A system administrator or other user manages the server array 530 using the administrative computing device 520 (or computing device 520). The computing device 520 is any of a variety of computing devices such as a desktop computer, a laptop computer, a tablet computer, a smartphone, and so on. In an implementation, the server array 530 is a grid of a relatively high number of servers 532-538 such as hundreds, thousands, or tens of thousands of server computers (or servers).

In some implementations, the server array 530 is a cluster or grid of servers that are grouped into what is referred to as a "server farm." The server farm includes one or more server arrays such as server array 530. In an implementation, the server farm is used as an exascale computing system, and each of the peripheral devices 590, 592, 594 and 596 of the server farm includes multiple parallel data processing units to provide a high-performance compute accelerator. Due to the high number of servers 532-538 in the server array 530, the computing device 520 uses automated management applications.

Additionally, it is possible that multiple external users and companies share access of the server array 530, and the computing device 520 also runs security applications. In some implementations, the applications for the automated management and the security management are run on multiple computing devices with secure access by the system administrator. It is noted that the peripheral devices 590, 592, 594 and 596 include the message converter units (MCUs) 591, 593, 595 and 597, which have the same functionality as the MCU 142 (of FIG. 1) and the MCU 200 (of FIG. 2).

As shown, similar to the other servers 532, 534 and 538 of the server array 530, the server 536 includes at least the multiple components 540-596. The network interface 540 includes hardware, such as circuitry, for supporting a communication protocol that enables communication with the network 510. The network interface 540 includes one or more queues for storing requests, responses, and messages. The circuitry of the network interface 540 also builds packets for transmitting to the network 510, and disassembles packets received from network 510. The functionality of network interface 540 can be included on a network adapter card. The system on a chip (SoC) 560 includes a variety of processing units and functional blocks providing a variety of functionalities such as at least processors 562-564. For example, in some implementations, the SoC 560 includes one or more of a central processing unit (CPU) with circuitry used for processing instructions of a selected instruction set architecture (ISA), one or more application specific integrated circuits (ASICs) or microcontrollers, and so on. It is noted that the SoC 560 includes an address translation unit (ATU) 566, which has the same functionality as the ATU 164 and the mapping table 166 (of FIG. 1).

The memory medium 570 is one of variety of types of a hard disk drive (HDD) and stores a base operating system (OS) 572, one or more applications 574, and data (not shown). The server 536 also includes multiple connectors 580-586. In some implementations, each of the connectors 580-586 provides an interface such as a socket or a slot on a motherboard of the server 536. The peripheral devices 590-596 transfer data with semiconductor chips on the motherboard of the server 536 through the connectors 580-586. Each of the connectors 580-586 includes multiple pins. A particular type of signal of multiple signal types is transmitted on a particular pin of the multiple pins based on a predetermined assignment. This assignment, or mapping, of the multiple signal types to the multiple pins is defined by a particular communication protocol used to transfer data through one of the connectors 580-586. In addition, the physical size and placement of the pins are set by what is referred to as a "form factor" of a connector of the connectors 580-586. The form factor is the specified mechanical properties of a connector of the connectors 580-586 such as the length and the width of the connector, the number of pins of the connector, the placement and spacing of the pins, and so forth.

In some implementations, a cable is used to transfer data between the motherboard of the server 536 and one of the peripheral devices 590-596. The physical traits of the cable end that is inserted into a connector of the connectors 580-586 are determined by the form factor of the connector of the connectors 580-586. Although the SoC 560 runs a local MCA different from remote MCAs of the peripheral devices 590-596, the local MCA of the SoC 560 and the remote MCAs of the peripheral devices 590-596 pare able to communicate based at least in part on the functionality of the message converter units (MCUs) 591, 593, 595 and 597.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer.

For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a remote processing circuit;
   wherein the remote processing circuit is configured to:
      detect an error;
      store error log information corresponding to the error in a first storage location reserved for the remote processing circuit, wherein an operating system executed by a host processing circuit does not have access to the first storage location;
      retrieve a target address pointing to a second storage location different from the first storage location, wherein the second storage location is accessible by the host processing circuit; and
      write to the second storage location, using the target address, a message indicating the error has occurred.

2. The apparatus as recited in claim 1, wherein the remote processing circuit is further configured to receive tasks to assigned by the host processing circuit executing a kernel of the operating system.

3. The apparatus as recited in claim 1, wherein the remote processing circuit is further configured to:
   retrieve a processor core identifier specifying the host processing circuit; and
   write the processor core identifier into the message.

4. The apparatus as recited in claim 3, wherein:
   the host processing circuit is configured to perform error management based on a first machine check architecture; and
   the remote processing circuit is further configured to perform error management based on a second machine check architecture different from the first machine check architecture.

5. The apparatus as recited in claim 3, wherein the remote processing circuit is further configured to access a configuration register that stores target addresses pointing to storage locations that are accessible by the host processing circuit.

6. The apparatus as recited in claim 3, wherein the remote processing circuit is one of a plurality of processing circuits of a compute accelerator.

7. The apparatus as recited in claim 6, wherein the remote processing circuit is further configured to send the message to the host processing circuit via a connector that is a slot on a motherboard.

8. A method, comprising:
   transferring data between a host processing circuit and a peripheral device comprising at least a remote processing circuit;
   detecting, by the remote processing circuit, an error in the peripheral device;
   storing, by the remote processing circuit, error log information corresponding to the error in a first storage location reserved for the remote processing circuit, wherein an operating system executed by the host processing circuit does not have access to the first storage location;
   retrieving, by the remote processing circuit, a target address pointing to a second storage location different from the first storage location, wherein the second storage location is accessible by the host processing circuit; and
   writing to the second storage location using the target address, by the remote processing circuit, a message indicating the error has occurred.

9. The method as recited in claim 8, further comprising receiving, by the remote processing circuit, tasks assigned by the host processing circuit executing a kernel of the operating system.

10. The method as recited in claim 8, further comprising:
    retrieving, by the remote processing circuit, a processor core identifier specifying the host processing circuit; and
    writing, by the remote processing circuit, the processor core identifier into the message.

11. The method as recited in claim 10, further comprising:
    performing, by the host processing circuit, error management based on a first machine check architecture; and
    performing, by the remote processing circuit, error management based on a second machine check architecture different from the first machine check architecture.

12. The method as recited in claim 10, further comprising accessing, by the remote processing circuit, a configuration register that stores target addresses pointing to storage locations that are accessible by the host processing circuit.

13. The method as recited in claim 10, further comprising performing parallel data tasks by the remote processing circuit as one of a plurality of processing circuits of a compute accelerator.

14. The method as recited in claim 13, further comprising sending, by the remote processing circuit, the message to the host processing circuit via a connector that is a slot on a motherboard.

15. A computing system comprising:
    a server comprising:
       a peripheral device comprising at least a remote processing circuit; and a host processing circuit coupled to the peripheral device;

wherein the remote processing circuit is configured to:
   detect an error in the peripheral device;
   store error log information corresponding to the error in a first storage location reserved for the remote processing circuit, wherein an operating system executed by the host processing circuit is unaware of the first storage location;
   retrieve a target address pointing to a second storage location different from the first storage location, wherein the second storage location is reserved for the host processing circuit; and
   write, using the target address, a message indicating the error has occurred to the second storage location accessible by the host processing circuit.

16. The computing system as recited in claim 15, wherein the remote processing circuit is further configured to receive tasks assigned by the host processing circuit executing a kernel of the operating system.

17. The computing system as recited in claim 15, wherein the remote processing circuit is further configured to:
   retrieve a processor core identifier specifying the host processing circuit; and
   write the processor core identifier into the message.

18. The computing system as recited in claim 17, wherein:
   the host processing circuit is configured to perform error management based on a first machine check architecture; and
   the remote processing circuit is further configured to perform error management based on a second machine check architecture different from the first machine check architecture.

19. The computing system as recited in claim 17, wherein the remote processing circuit is further configured to access a configuration register that stores target addresses pointing to storage locations that are accessible by the host processing circuit.

20. The computing system as recited in claim 19, wherein the remote processing circuit is one of a plurality of processing circuits of a compute accelerator.

* * * * *

UNITED STATES PATENT AND TRADEMARK OFFICE
CERTIFICATE OF CORRECTION

PATENT NO. : 12,111,719 B2
APPLICATION NO. : 17/854788
DATED : October 8, 2024
INVENTOR(S) : Sridharan et al.

Page 1 of 1

It is certified that error appears in the above-identified patent and that said Letters Patent is hereby corrected as shown below:

In the Claims

Column 13, Claim 2, Line 56-57, please delete "receive tasks to assigned" and insert -- receive tasks assigned --.

Signed and Sealed this
Eighteenth Day of March, 2025

Coke Morgan Stewart
*Acting Director of the United States Patent and Trademark Office*